United States Patent
Qu et al.

(10) Patent No.: US 11,470,585 B2
(45) Date of Patent: Oct. 11, 2022

(54) METHOD AND DEVICE FOR DETERMINING UPLINK MULTIPLEXED TIME-FREQUENCY RESOURCE, STORAGE MEDIUM, AND USER EQUIPMENT

(71) Applicant: BEIJING SPREADTRUM HI-TECH COMMUNICATIONS TECHNOLOGY CO., LTD., Beijing (CN)

(72) Inventors: Xin Qu, Shanghai (CN); Zhikun Xu, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/764,348

(22) PCT Filed: Jun. 26, 2019

(86) PCT No.: PCT/CN2019/093019
§ 371 (c)(1),
(2) Date: May 14, 2020

(87) PCT Pub. No.: WO2020/034768
PCT Pub. Date: Feb. 20, 2020

(65) Prior Publication Data
US 2021/0160854 A1     May 27, 2021

(30) Foreign Application Priority Data
Aug. 14, 2018   (CN) .......................... 201810921802.4

(51) Int. Cl.
*H04W 72/04*    (2009.01)
*H04L 5/00*    (2006.01)

(52) U.S. Cl.
CPC ....... *H04W 72/0413* (2013.01); *H04L 5/0005* (2013.01); *H04L 5/0053* (2013.01); *H04W 72/0453* (2013.01)

(58) Field of Classification Search
CPC .............. H04L 5/0005; H04L 5/0053; H04W 72/0413; H04W 72/0453; H04W 72/042;
(Continued)

(56) References Cited

U.S. PATENT DOCUMENTS

2007/0115904 A1   5/2007   Chen et al.
2012/0129540 A1   5/2012   Hakola et al.
(Continued)

FOREIGN PATENT DOCUMENTS

CN    1929338 A    3/2007
CN    107241288 A    10/2017
(Continued)

OTHER PUBLICATIONS

CNIPA First Office Action for corresponding CN Application No. 201810921802.4; dated Aug. 5, 2020.
(Continued)

*Primary Examiner* — Maharishi V Khirodhar
*Assistant Examiner* — Kenneth P Hunt
(74) *Attorney, Agent, or Firm* — Cantor Colburn LLP

(57) ABSTRACT

A method and a device for determining an uplink multiplexed time-frequency resource, a storage medium, and a user equipment. The method may include: acquiring indication information of the uplink multiplexed time-frequency resource from a base station, wherein the indication information comprises resource indication information of a frequency domain resource in the uplink multiplexed time-frequency resource; determining resource information of the frequency domain resource based on the resource indication information; and determining resource information of a time
(Continued)

domain resource in the uplink multiplexed time-frequency resource at least based on a time domain position of the last symbol of the indication information. Resource information of a time domain resource may be determined based on less information, which facilitates saving signaling overheads of indication information of uplink multiplexed time-frequency resources.

16 Claims, 9 Drawing Sheets

(58) Field of Classification Search
CPC ............. H04W 56/00; H04W 72/0446; H04W 72/1242; H04W 72/1289
See application file for complete search history.

(56) References Cited

U.S. PATENT DOCUMENTS

| | | |
|---|---|---|
| 2017/0048878 A1 | 2/2017 | Zhang et al. |
| 2017/0332358 A1 | 11/2017 | Park et al. |
| 2018/0368080 A1 | 12/2018 | Chae et al. |
| 2020/0196339 A1* | 6/2020 | Jung ................. H04W 72/1273 |
| 2021/0014866 A1* | 1/2021 | Shi ........................ H04L 5/0051 |

FOREIGN PATENT DOCUMENTS

| | | |
|---|---|---|
| CN | 107295660 A | 10/2017 |
| CN | 105229979 B | 6/2019 |
| EP | 3316647 A1 | 5/2018 |
| WO | 2016201627 A1 | 12/2016 |

OTHER PUBLICATIONS

Vivo, 3rd Generation Partnership Project, "Multiplexing data with different transmission durations", 3GPP TSG RAN WG1 Meeting NR#3; 6 pages; Dated Sep. 18-21, 2017, R1-1715646.
International Search Report for corresponding International application No. PCT/CN2019/093019; dated Sep. 4, 2019.
EPO Extended European Search Report for corresponding EP Application No. 19849435.3; dated Oct. 15, 2021.
Vivo, UL inter-UE Tx prioritization for RLLC11, 3GPP TSG RAN WG1 Meeting #94; RI-1808249; 3rd Generation Partnership Project (3GPP), Aug. 20-24, 2018; 8 pages.

* cited by examiner

METHOD AND DEVICE FOR DETERMINING UPLINK MULTIPLEXED TIME-FREQUENCY RESOURCE, STORAGE MEDIUM, AND USER EQUIPMENT

CROSS-REFERENCE TO RELATED APPLICATIONS

This application is the nation phase of International Application No. PCT/CN2019/093019, filed on Jun. 26, 2019, which claims the benefit of priority to Chinese Patent Application No. 201810921802.4, filed on Aug. 14, 2018, and entitled "METHOD AND DEVICE FOR DETERMINING UPLINK MULTIPLEXED TIME-FREQUENCY RESOURCE, STORAGE MEDIUM, AND USER EQUIPMENT", the entire disclosure of which is incorporated herein by reference.

TECHNICAL FIELD

The present disclosure generally relates to communication technology field, and more particularly, to a method and a device for determining an uplink multiplexed time-frequency resource, a storage medium and a user equipment.

BACKGROUND

In 5G communication services, to improve resource utilization, users with different data transmission durations may multiplex same time-frequency physical resources. Specifically, to meet low latency requirements of a short-duration user, such as an Ultra Reliable & Low Latency Communications (URLLC) user, a base station may schedule the short-duration user on physical resources of a scheduled long-duration user, such as an Enhanced Mobile Broadband (eMBB) user, so that the short-duration user multiplexes the resources of the long-duration user, which may cause some data of the long-duration user to be destroyed.

At present, the standardization work of R15 is mainly directed to multiplexing of downlink resources with different durations. Occupation indication is sent to long-duration users whose time-frequency resources are compulsively occupied by short-duration users, so as to indicate a range of the compulsively occupied time-frequency resources of the long-duration users. The long-duration users can post-process decoding results transmitted on the compulsively occupied time-frequency resources based on the occupation indication, so as to improve decoding success probability.

However, in existing techniques, the base station needs to determine the indication information of uplink multiplexed time-frequency resources for the long-duration users, and dynamic signaling or high-layer signaling is used to send a large amount of indication information, such as start positions, durations or end positions of the uplink multiplexed time-frequency resources, which greatly increases signaling overhead.

SUMMARY

Embodiments of the present disclosure provide a method and a device for determining an uplink multiplexed time-frequency resource, a storage medium and a user equipment. Resource information of a time domain resource may be determined based on less information, which facilitates saving signaling overheads of indication information of uplink multiplexed time-frequency resources.

In an embodiment of the present disclosure, a method for determining an uplink multiplexed time-frequency resource is provided, including: acquiring indication information of the uplink multiplexed time-frequency resource from a base station, wherein the indication information includes resource indication information of a frequency domain resource in the uplink multiplexed time-frequency resource; determining resource information of the frequency domain resource based on the resource indication information; and determining resource information of a time domain resource in the uplink multiplexed time-frequency resource at least based on a time domain position of the last symbol of the indication information.

Optionally, the resource information of the time domain resource includes a start position of the time domain resource, the indication information of the uplink multiplexed time-frequency resource further includes an offset, and determining the resource information of the time domain resource in the uplink multiplexed time-frequency resource at least based on the time domain position of the last symbol of the indication information includes: extracting the offset from the indication information; adding a preset processing duration to the time domain position of the last symbol of the indication information to obtain a reference start position; and adding the offset to the reference start position to obtain the start position of the time domain resource.

Optionally, extracting the offset from the indication information includes: determining a number of bits occupied by the offset; and extracting the offset from the indication information based on the number of bits occupied by the offset.

Optionally, the number of bits occupied by the offset is determined based on the following formula, $$J = \text{ceil}(\log(L \cdot 2^{\mu-\mu'})),$$

where J is the number of bits occupied by the offset, $\mu$ is sub-carrier spacing configuration of a serving cell where uplink time-frequency resource multiplexing occurs, $\mu'$ is sub-carrier spacing configuration of a serving cell sending the indication information of the uplink multiplexed time-frequency resource, and L is a number of time domain uplink symbols contained in a monitoring period indicated by the uplink multiplexed time-frequency resource.

Optionally, adding the preset processing duration to the time domain position of the last symbol of the indication information to obtain the reference start position includes: determining that the time domain position of the last symbol of the indication information is a symbol $\lfloor M \cdot 2^{\mu-\mu'} \rfloor$ in a first time slot; determining the preset processing duration for processing the uplink multiplexed time-frequency resource as X symbols; and determining that the reference start position is a symbol $\lfloor M \cdot 2^{\mu-\mu'} \rfloor + X + 1$ in the first time slot or a symbol $(\lfloor M \cdot 2^{\mu-\mu'} \rfloor + X + 1) \bmod 14$ in a second time slot following the first time slot, where $\mu$ is sub-carrier spacing configuration of a serving cell where uplink time-frequency resource multiplexing occurs, and $\mu'$ is sub-carrier spacing configuration of a serving cell sending the indication information of the uplink multiplexed time-frequency resource.

Optionally, the resource information of the time domain resource includes a start position of the time domain resource, and determining the resource information of the time domain resource in the uplink multiplexed time-frequency resource at least based on the time domain position of the last symbol of the indication information includes: adding a preset processing duration to a time domain position of the last symbol of the indication information to obtain the start position of the time domain resource.

Optionally, adding the preset processing duration to the time domain position of the last symbol of the indication information to obtain the start position of the time domain resource includes: determining that the time domain position of the last symbol of the indication information is a symbol $\lfloor M \cdot 2^{\mu-\mu'} \rfloor$ in a first time slot; determining the preset processing duration for processing the uplink multiplexed time-frequency resource as X symbols; and determining that the start position is a symbol $\lfloor M \cdot 2^{\mu-\mu'} \rfloor + X + 1$ in the first time slot or a symbol $(\lfloor M \cdot 2^{\mu-\mu'} \rfloor + X + 1) \bmod 14$ in a second time slot following the first time slot, where $\mu$ is sub-carrier spacing configuration of a serving cell where uplink time-frequency resource multiplexing occurs, and $\mu'$ is sub-carrier spacing configuration of a serving cell sending the indication information of the uplink multiplexed time-frequency resource.

Optionally, the resource information of the time domain resource further includes an end position of the time domain resource, and determining the resource information of the time domain resource in the uplink multiplexed time-frequency resource at least based on the time domain position of the last symbol of the indication information further includes: determining a third time slot where the start position of the time domain resource is located, and taking an end position of the third time slot as the end position of the time domain resource.

Optionally, a reference range of the frequency domain resource is divided into a plurality of frequency domain indication units, and determining resource information of the frequency domain resource based on the resource indication information includes: extracting the resource indication information from the indication information; determining a number of the plurality of frequency domain indication units and whether each of the plurality of frequency domain indication units is occupied based on the resource indication information; and taking information of the occupied frequency domain indication units as the resource information of the frequency domain resource, wherein the reference range of the frequency domain resource is pre-configured by the base station.

Optionally, extracting the resource indication information from the indication information includes: determining a bit number of the resource indication information to be (K−J) based on a preset bit number K of the indication information of the uplink multiplexed time-frequency resource, where J is the bit number occupied by the offset; and extracting the resource indication information from the indication information based on the bit number (K−J) of the resource indication information, where a number of the plurality of frequency domain indication units is (K−J).

Optionally, the indication information does not include an offset, a reference range of the frequency domain resource is divided into a plurality of frequency domain indication units, and determining resource information of the frequency domain resource based on the resource indication information includes: determining a number of the plurality of frequency domain indication units and whether each of the plurality of frequency domain indication units is occupied based on the resource indication information; and taking information of the occupied frequency domain indication units as the resource information of the frequency domain resource, wherein the reference range of the frequency domain resource is pre-configured by the base station.

Optionally, the indication information of the uplink multiplexed time-frequency resource further includes an identifier for indicating whether the indication information includes the offset.

In an embodiment of the present disclosure, a device for determining an uplink multiplexed time-frequency resource is provided, including: an acquiring circuitry configured to acquire indication information of the uplink multiplexed time-frequency resource from a base station, wherein the indication information includes resource indication information of a frequency domain resource in the uplink multiplexed time-frequency resource; a frequency domain determining circuitry configured to determine resource information of the frequency domain resource based on the resource indication information; and a time domain determining circuitry configured to determine resource information of a time domain resource in the uplink multiplexed time-frequency resource at least based on a time domain position of the last symbol of the indication information.

Optionally, the resource information of the time domain resource includes a start position of the time domain resource, the indication information of the uplink multiplexed time-frequency resource further includes an offset, and the time domain determining circuitry includes: an extracting sub-circuitry configured to extract the offset from the indication information; a reference start determining sub-circuitry configured to add a preset processing duration to the time domain position of the last symbol of the indication information to obtain a reference start position; and a first time domain start determining sub-circuitry configured to add the offset to the reference start position to obtain the start position of the time domain resource.

Optionally, the extracting sub-circuitry includes: a bit number determining unit configured to determine a number of bits occupied by the offset; and an extracting unit configured to extract the offset from the indication information based on the number of bits occupied by the offset.

Optionally, the number of bits occupied by the offset is determined by the bit number determining unit based on the following formula, $$J = \mathrm{ceil}(\log(L \cdot 2^{\mu-\mu'}))$$

where J is the number of bits occupied by the offset, $\mu$ is sub-carrier spacing configuration of a serving cell where uplink time-frequency resource multiplexing occurs, $\mu'$ is sub-carrier spacing configuration of a serving cell sending the indication information of the uplink multiplexed time-frequency resource, and L is a number of time domain uplink symbols contained in a monitoring period indicated by the uplink multiplexed time-frequency resource.

Optionally, the reference start determining sub-circuitry includes: a first symbol M determining unit configured to determine that the time domain position of the last symbol of the indication information is a symbol $\lfloor M \cdot 2^{\mu-\mu'} \rfloor$ in a first time slot; a first X symbol determining unit configured to determine the preset processing duration for processing the uplink multiplexed time-frequency resource as X symbols; and a reference start determining unit configured to determine that the reference start position is a symbol $\lfloor M \cdot 2^{\mu-\mu'} \rfloor + X + 1$ in the first time slot or a symbol $(\lfloor M \cdot 2^{\mu-\mu'} \rfloor + X + 1) \bmod 14$ in a second time slot following the first time slot, where $\mu$ is sub-carrier spacing configuration of a serving cell where uplink time-frequency resource multiplexing occurs, and $\mu'$ is sub-carrier spacing configuration of a serving cell sending the indication information of the uplink multiplexed time-frequency resource.

Optionally, the resource information of the time domain resource includes a start position of the time domain resource, and the time domain determining circuitry includes: a second time domain start determining sub-circuitry configured to add a preset processing duration to a time domain position of the last symbol of the indication information to obtain the start position of the time domain resource.

Optionally, the second time domain start determining sub-circuitry includes: a second symbol M determining unit configured to determine that the time domain position of the last symbol of the indication information is a symbol $\lfloor M \cdot 2^{\mu-\mu'} \rfloor$ in a first time slot; a second X symbol determining unit configured to determine the preset processing duration for processing the uplink multiplexed time-frequency resource as X symbols; and a time domain start determining unit configured to determine that the start position is a symbol $\lfloor M \cdot 2^{\mu-\mu'} \rfloor + X+1$ in the first time slot or a symbol $(\lfloor M \cdot 2^{\mu-\mu'} \rfloor + X+1) \bmod 14$ in a second time slot following the first time slot, where $\mu$ is sub-carrier spacing configuration of a serving cell where uplink time-frequency resource multiplexing occurs, and $\mu'$ is sub-carrier spacing configuration of a serving cell sending the indication information of the uplink multiplexed time-frequency resource.

Optionally, the resource information of the time domain resource further includes an end position of the time domain resource, and the time domain determining circuitry further includes: a second end determining sub-circuitry configured to determine a third time slot where the start position of the time domain resource is located, and take an end position of the third time slot as the end position of the time domain resource.

Optionally, a reference range of the frequency domain resource is divided into a plurality of frequency domain indication units, and the frequency domain determining circuitry includes: an information extracting sub-circuitry configured to extract the resource indication information from the indication information; a first number determining sub-circuitry configured to determine a number of the plurality of frequency domain indication units and whether each of the plurality of frequency domain indication units is occupied based on the resource indication information; and a first information determining sub-circuitry configured to take information of the occupied frequency domain indication units as the resource information of the frequency domain resource, wherein the reference range of the frequency domain resource is pre-configured by the base station.

Optionally, the information extracting sub-circuitry includes: a frequency domain bit number determining unit configured to determine a bit number of the resource indication information to be (K−J) based on a preset bit number K of the indication information of the uplink multiplexed time-frequency resource, where J is the bit number occupied by the offset; and an information extracting unit configured to extract the resource indication information from the indication information based on the bit number (K−J) of the resource indication information, where a number of the plurality of frequency domain indication units is (K−J).

Optionally, the indication information does not include an offset, a reference range of the frequency domain resource is divided into a plurality of frequency domain indication units, and the frequency domain determining circuitry includes: a second number determining sub-circuitry configured to determine a number of the plurality of frequency domain indication units and whether each of the plurality of frequency domain indication units is occupied based on the resource indication information; and a second information determining sub-circuitry configured to take information of the occupied frequency domain indication units as the resource information of the frequency domain resource, wherein the reference range of the frequency domain resource is pre-configured by the base station.

Optionally, the indication information of the uplink multiplexed time-frequency resource further includes an identifier for indicating whether the indication information includes the offset.

In an embodiment of the present disclosure, a storage medium having computer instructions stored therein is provided, wherein when the computer instructions are executed, the above method is performed.

In an embodiment of the present disclosure, a user equipment including a memory and a processor is provided, wherein the memory has computer instructions stored therein, and when the processor executes the computer instructions, the above method is performed.

Embodiments of the present disclosure may provide following advantages. In embodiments of the present disclosure, indication information of the uplink multiplexed time-frequency resource is acquired from a base station, wherein the indication information includes resource indication information of a frequency domain resource in the uplink multiplexed time-frequency resource. Resource information of the frequency domain resource is determined based on the resource indication information, and resource information of a time domain resource in the uplink multiplexed time-frequency resource is determined at least based on a time domain position of the last symbol of the indication information. By the embodiments of the present disclosure, a user equipment acquires the indication information of the uplink multiplexed time-frequency resource from the base station, determines the resource information of the frequency domain resource based on the resource indication information, and further determines the resource information of the time domain resource in the uplink multiplexed time-frequency resource at least based on the time domain position of the last symbol of the indication information, where content of the resource indication information is unnecessary for the determination of the resource information of the time domain resource. In the existing techniques, the base station needs to send a large amount of information using dynamic signaling or high-layer signaling to indicate resource information of the time domain resource, such as start positions, durations or end positions of uplink multiplexed time domain resources, which requires high signaling overhead. However, by embodiments of the present disclosure, the resource information of the time domain resource may be determined based on less information, which facilitates saving signaling overheads of indication information of uplink multiplexed time-frequency resources.

Further, in some embodiments, a time-frequency domain range of the uplink multiplexed time-frequency resource may be determined in a variety of ways, which is helpful for users to select according to specific needs and improves convenience.

Further, in some embodiments, an identifier is set for indicating whether the indication information of the uplink multiplexed time-frequency resource includes the offset. The base station may select to configure only one type of indication information or two types of indication information for the users, and the base station may be indicated to confirm when the indication information is sent each time, so that flexibility is improved.

DETAILED DESCRIPTION

Figure 1:
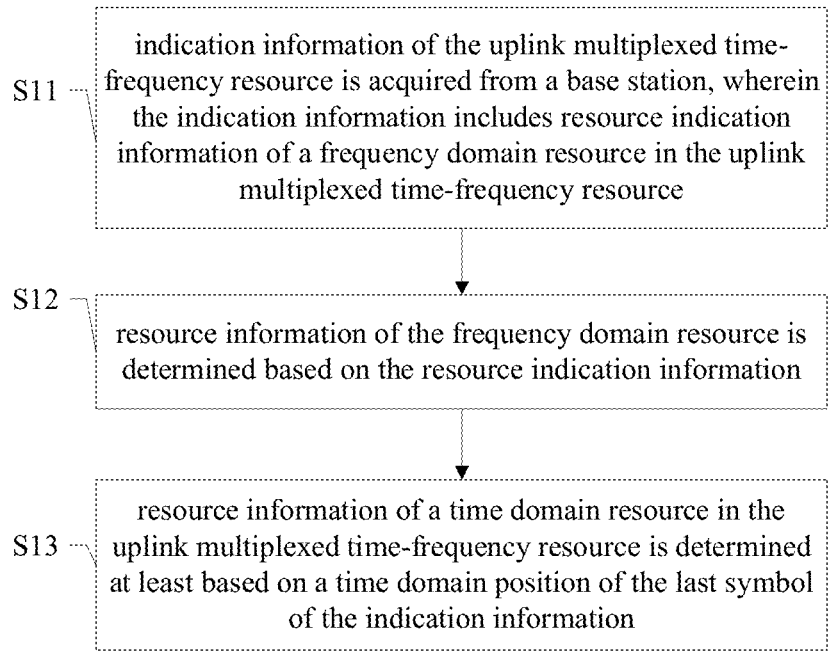
FIG. 1 is a flow chart of a method for determining an uplink multiplexed time-frequency resource according to an embodiment.

In 5G communication services, to improve resource utilization, users with different data transmission durations may multiplex same time-frequency physical resources. For example, eMBB users and URLLC users can multiplex uplink time-frequency resources to perform data transmission.

At present, the standardization work of R15 is mainly directed to multiplexing of downlink resources with different durations. Occupation indication is sent to long-duration users whose time-frequency resources are compulsively occupied by short-duration users, so as to indicate a range of the compulsively occupied time-frequency resources of the long-duration users. The long-duration users can post-process decoding results transmitted on the compulsively occupied time-frequency resources based on the occupation indication, so as to improve decoding success probability. For multiplexing of uplink resources with different durations, the problem that data of long-duration users being damaged also exists. Therefore, uplink multiplexed time-frequency resource indication should be introduced in uplink resource multiplexing. Further, for uplink multiplexing, to ensure uplink transmission reliability of short-duration users, the long-duration users need to acquire the uplink multiplexed time-frequency resource indication before the transmission by the short-duration users, so that corresponding transmission adjustment can be performed on time-frequency resources to be multiplexed by the short-duration users, including but not limited to pausing transmission by the long-duration users or reducing transmission power. Therefore, a transmission period of the uplink multiplexed time-frequency resource indication should be consistent with a monitoring period of uplink scheduling of the short-duration users.

In an existing time domain indication method for an uplink multiplexed time-frequency domain resource, a time domain start position of an uplink multiplexed time domain resource is indicated to a user by sending an offset to the user, where the offset is an offset relative to uplink multiplexed time-frequency resource indication. Besides, a base station configures a value set of the offset for the user through high-layer signaling, and one in the set is sent to the user through the uplink multiplexed time-frequency resource indication.

Inventors found that in the existing techniques, for different monitoring periods of uplink multiplexed time-frequency domain indication, a plurality of time domain offset sets need to be configured according to actual monitoring period length, which causes a waste of high-layer signaling resources.

In another existing time domain indication method for an uplink multiplexed time-frequency domain resource, a reference range of an uplink multiplexed time domain resource is determined for a user, specifically, an offset relative to an uplink multiplexed time-frequency resource indication is sent via dynamic signaling or high-layer signaling to determine a start position of the reference range of the uplink multiplexed time domain resource. Further, in the determined reference range, an offset is sent to the user to indicate the start position of the uplink multiplexed time domain resource, where the offset is an offset relative to the start position of the reference range of the uplink multiplexed time domain resource. Further, the base station configures a value set of the offset for the user through high-layer signaling, and one in the set is sent to the user through the uplink multiplexed time-frequency resource indication.

The inventors found that in the above existing techniques, signaling needs to be sent to indicate the start position of the reference range and the start position of the time domain resource in sequence, which also causes a waste of dynamic signaling and high-layer signaling resources.

In embodiments of the present disclosure, indication information of the uplink multiplexed time-frequency resource is acquired from a base station, wherein the indication information includes resource indication information of a frequency domain resource in the uplink multiplexed time-frequency resource. Resource information of the frequency domain resource is determined based on the resource indication information, and resource information of a time domain resource in the uplink multiplexed time-frequency resource is determined at least based on a time domain position of the last symbol of the indication information. By the embodiments of the present disclosure, a user equipment acquires the indication information of the uplink multiplexed time-frequency resource from the base station, determines the resource information of the frequency domain resource based on the resource indication information, and further determines the resource information of the time domain resource in the uplink multiplexed time-frequency resource at least based on the time domain position of the last symbol of the indication information, where content of the resource indication information is unnecessary for the determination of the resource information of the time domain resource. In the existing techniques, the base station needs to send a large amount of information using dynamic signaling or high-layer signaling to indicate resource information of the time domain resource, such as start positions, durations or end positions of uplink multiplexed time domain resources, which requires high signaling overhead. However, by embodiments of the present disclosure, the resource information of the time domain resource may be determined based on less information, which facilitates saving signaling overheads of indication information of uplink multiplexed time-frequency resources.

In order to clarify the object, characteristic and advantages of embodiments of the present disclosure, embodiments of present disclosure will be described clearly in detail in conjunction with accompanying drawings.

Referring to FIG. 1, FIG. 1 is a flow chart of a method for determining an uplink multiplexed time-frequency resource according to an embodiment. The method includes S11, S12 and S13.

In S11, indication information of the uplink multiplexed time-frequency resource is acquired from a base station, wherein the indication information includes resource indication information of a frequency domain resource in the uplink multiplexed time-frequency resource.

In S12, resource information of the frequency domain resource is determined based on the resource indication information.

In S13, resource information of a time domain resource in the uplink multiplexed time-frequency resource is determined at least based on a time domain position of the last symbol of the indication information.

In some embodiments, in S11, the base station may send uplink multiplexed time-frequency resource indication by adopting an existing downlink control information (DCI) format in 5G NR or a newly defined DCI format. The base station pre-configures for a user equipment a DCI format size for sending the uplink multiplexed time-frequency resource indication, where the DCI format size includes N uplink multiplexed time-frequency resource indication fields each of which includes an uplink multiplexed time-frequency resource indication of K bits. Besides, the base station pre-configures for the user equipment a corresponding relation between the uplink multiplexed time-frequency resource indication fields and serving cells. The base station sends the uplink multiplexed time-frequency resource indication through dynamic signaling on a User Equipment-Specific PDCCH (UE-specific PDCCH) or a Group common Physical Downlink Control Channel (Group common PDCCH).

In some embodiments, the indication information includes resource indication information of the frequency domain resource in the uplink multiplexed time-frequency resource, and may not include resource indication information of the time domain resource in the uplink multiplexed time-frequency resource.

In some embodiments, if the indication information does not include the resource indication information of the time domain resource, the K bits may be all used for the resource indication information of the frequency domain resource. In some embodiments, in S12, the resource information of the frequency domain resource is determined based on the resource indication information of the frequency domain resource in the resource indication information.

In some embodiments, different implementation methods may be adopted based on whether the indication information includes the resource indication information of the time domain resource, namely whether the resource indication information of the frequency domain resource needs to be extracted. The resource indication information may be an offset.

Figure 2:
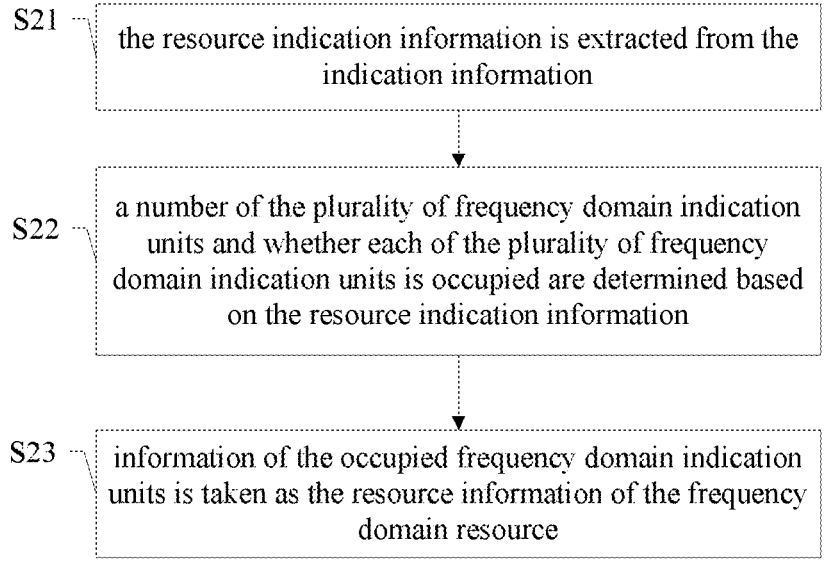
FIG. 2 is a flow chart of S12 as shown in FIG. 1 according to an embodiment.

Referring to FIG. 2, FIG. 2 is a flow chart of S12 as shown in FIG. 1 according to an embodiment. Determining the resource information of the frequency domain resource based on the resource indication information may include S21, S22 and S23, which is described in detail below.

In S21, the resource indication information is extracted from the indication information.

In some embodiments, if the indication information includes resource indication information of the time domain resource, for example, an offset, the resource indication information of the frequency domain resource needs to be extracted from the indication information.

In some embodiments, extracting the resource indication information from the indication information may include: determining a bit number of the resource indication information to be (K−J) based on a preset bit number K of the indication information of the uplink multiplexed time-frequency resource, where J is the bit number occupied by the offset; and extracting the resource indication information from the indication information based on the bit number (K−J) of the resource indication information, where a number of frequency domain indication units is (K−J).

In some embodiments, if the indication information includes the resource indication information of the time domain resource, the resource indication information of the time domain resource may be represented by J bits, so that the number of bits of the resource indication information can be determined to be (K−J).

In some embodiments, a position of the (K−J) bits in the indication information may be configured in a preset mode, for example, the resource indication information for configuring the time domain resource is located in front of the resource indication information for configuring the frequency domain resource.

In some embodiments, K may be greater than or equal to J.

In some embodiments, if J bits are adopted to represent the resource indication information of the time domain resource in the indication information and J is equal to K, it can be understood that the whole indication information is used for indicating the resource information of the time domain resource. In this case, no residual bit serves as resource indication information of the frequency domain resource to indicate resource information of the frequency domain resource, where the resource indication information of the frequency domain resource can be regarded as 0-bit information.

Further, according to the determined J and J=K, the user equipment may determine to cancel uplink transmission in a whole reference range of the frequency domain resource pre-configured by the base station based on the resource information of the time domain resource. It can be understood that the resource indication information is used for indicating the resource information of the frequency domain resource, and under the special condition of J=K, the indication information of the uplink multiplexed time-frequency resource can be regarded as including 0-bit resource indication information of the frequency domain resource. The special situation is caused as the bit number K of the indication information of the uplink multiplexed time-frequency resource is relatively small, but not because the reference range of the frequency domain resource is not intended to be divided from the beginning.

In some embodiments, the number of the frequency domain indication units may be the same as the number of bits of the resource indication information of the frequency domain resource and is (K−J), so that whether each frequency domain indication unit is multiplexed (also can be referred to as occupied) is indicated by adopting a mode of representing one frequency domain indication unit by one bit. For example, if (K−J) is 3, the reference range of the frequency domain resource is divided into three frequency domain indication units. If the frequency domain indication units 2 and 3 are occupied, the resource indication information of the frequency domain resource can be represented by '011'.

In some embodiments, the remaining (K−J) bits in the K bits are used to indicate the position of the multiplexed uplink time-frequency resource in the frequency domain. All physical resource blocks (PRBs) within the reference range of the frequency domain resource are divided into (K−J) frequency domain indication units, each frequency domain indication unit is represented by one bit, '1' indicates that the frequency domain indication unit is multiplexed, and '0' indicates that the frequency domain indication unit is not multiplexed. A size of the frequency domain indication unit corresponding to each of the first mod (B, K−J) bits in the (K−J) bits is ceil (B/(K−J)) PRBs, a size of the frequency domain indication unit corresponding to each of the last (K-mod (B, K−J)) bits is floor (B/(K−J)) PRBs, and B is a number of total PRBs included in the reference range of the frequency domain resource.

In S22, a number of the plurality of frequency domain indication units and whether each of the plurality of frequency domain indication units is occupied are determined based on the resource indication information.

In some embodiments, the reference range of the frequency domain resource may be divided into the plurality of frequency domain indication units, and may be pre-configured by the base station.

Based on the number of the frequency domain indication units and whether each of the plurality of frequency domain indication units is occupied, the user equipment determines that one or more frequency domain indication units including the uplink multiplexed time-frequency resource are occupied, and then stops uploading data in frequency domain resources corresponding to the one or more frequency domain indication units.

In S23, information of the occupied frequency domain indication units is taken as the resource information of the frequency domain resource, wherein the reference range of the frequency domain resource is pre-configured by the base station.

In some embodiments, the reference range of the frequency domain resource may be pre-configured by the base station, and may include, for example, detailed pre-configured frequency domain resources, or an uplink bandwidth part (BWP) which is currently activated by a user.

It can be understood that a frequency domain range of the occupied frequency domain indication units includes frequency domain resources in the uplink multiplexed time-frequency resources, that is, the frequency domain range of the one or more frequency domain indication units is wider than or equal to the frequency domain resources really multiplexed in the uplink multiplexed time-frequency resources.

Figure 3:
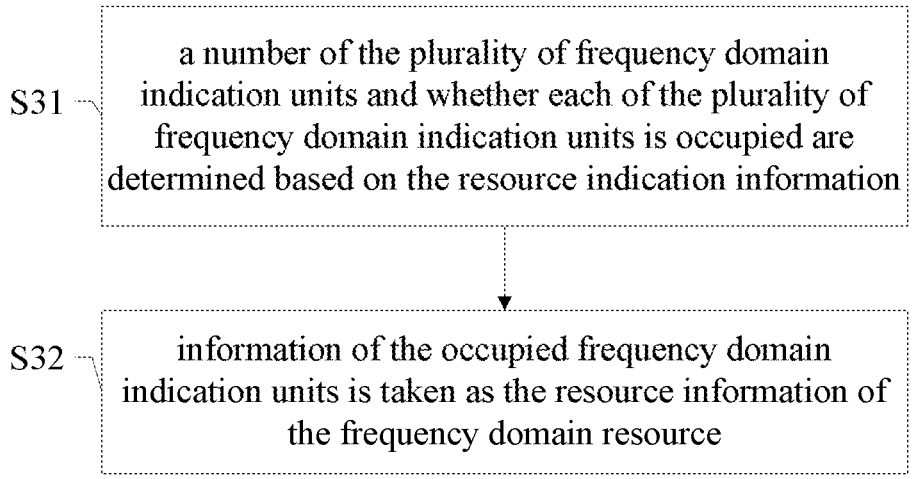
FIG. 3 is a flow chart of S12 as shown in FIG. 1 according to another embodiment.

Referring to FIG. 3, FIG. 3 is a flow chart of S12 as shown in FIG. 1 according to another embodiment. Determining the resource information of the frequency domain resource based on the resource indication information may include S31, S32 and S33, which is described in detail below.

In S31, a number of the plurality of frequency domain indication units and whether each of the plurality of frequency domain indication units is occupied are determined based on the resource indication information.

In some embodiments, if the indication information does not include an offset, there is no need to extract information from the resource indication information.

In some embodiments, the reference range of the frequency domain resource is divided into a plurality of frequency domain indication units and is pre-configured by the base station.

Based on the number of the frequency domain indication units and whether each of the plurality of frequency domain indication units is occupied, the user equipment determines that one or more frequency domain indication units including the uplink multiplexed time-frequency resource are occupied, and then stops uploading data in frequency domain resources corresponding to the one or more frequency domain indication units.

In S32, information of the occupied frequency domain indication units is taken as the resource information of the frequency domain resource, wherein the reference range of the frequency domain resource is pre-configured by the base station.

It can be understood that a frequency domain range of the occupied frequency domain indication units does not include frequency domain resources in the uplink multiplexed time-frequency resources, that is, the frequency domain range of the one or more frequency domain indication units is wider than or equal to the frequency domain resources really multiplexed in the uplink multiplexed time-frequency resources.

In some embodiments, the number of the frequency domain indication units may be the same as the number of bits of the resource indication information of the frequency domain resource and is K, so that whether each frequency domain indication unit is multiplexed (also can be referred to as occupied) is indicated by adopting a mode of representing one frequency domain indication unit by one bit.

For example, if K is 6, the reference range of the frequency domain resource is divided into six frequency domain indication units. If the frequency domain indication units 4 and 5 are occupied, the resource indication information of the frequency domain resource can be represented by '000110'.

In some embodiments, the K bits are all used to indicate the position of the multiplexed uplink time-frequency resource in the frequency domain. All physical resource blocks (PRBs) within the reference range of the frequency domain resource are divided into K frequency domain indication units, each frequency domain indication unit is represented by one bit, '1' indicates that the frequency domain indication unit is multiplexed, and '0' indicates that the frequency domain indication unit is not multiplexed. A size of the frequency domain indication unit corresponding to each of the first mod (B, K) bits in the K bits is ceil (B/K) PRBs, a size of the frequency domain indication unit corresponding to each of the last (K-mod (B, K)) bits is floor (B/K) PRBs, and N is a number of total PRBs included in the reference range of the frequency domain resource. The reference range of the frequency domain resource may be obtained in an explicit manner, for example, pre-configured by the base station, or obtained in an implicit manner, i.e., an uplink BWP currently activated by the user.

More details about S31 and S32 in FIG. 3 can be referred to the above descriptions of S21 to S23 in FIG. 2, and are not described here.

Still referring to FIG. 1, in some embodiments, in S13, the resource information of the time domain resource in the uplink multiplexed time-frequency resource is determined at least based on the time domain position of the last symbol of the indication information.

In the embodiments of the present disclosure, the user equipment acquires the indication information of the uplink multiplexed time-frequency resource from the base station, determines the resource information of the frequency domain resource based on the resource indication information, and further determines the resource information of the time domain resource in the uplink multiplexed time-frequency resource at least based on the time domain position of the last symbol of the indication information, where content of the resource indication information is unnecessary for the determination of the resource information of the time domain resource. In the existing techniques, the base station needs to send a large amount of information using dynamic signaling or high-layer signaling to indicate resource information of the time domain resource, such as start positions, durations or end positions of uplink multiplexed time domain resources, which requires high signaling overhead. However, by embodiments of the present disclosure, the resource information of the time domain resource is possible to be determined at least based on the time domain position of the last symbol of the indication information, which facilitates saving signaling overheads of indication information of uplink multiplexed time-frequency resources.

Figure 4:
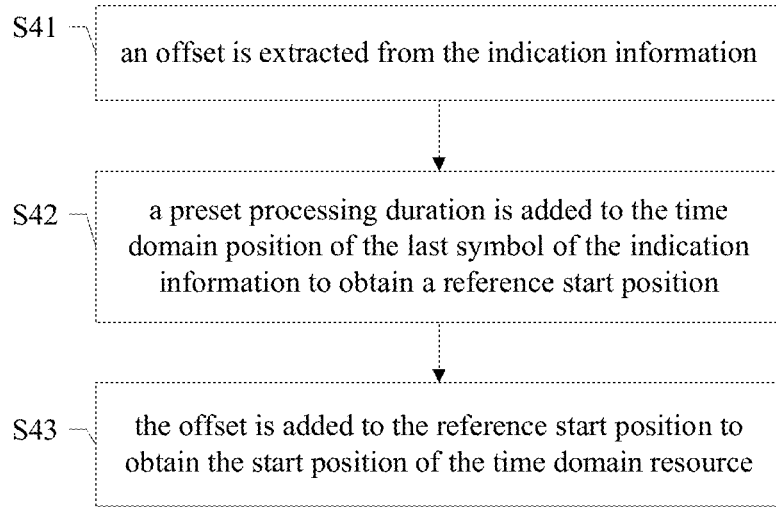
FIG. 4 is a flow chart of S13 as shown in FIG. 1 according to an embodiment.

Referring to FIG. 4, FIG. 4 is a flow chart of S13 as shown in FIG. 1 according to an embodiment. Determining the resource information of the time domain resource in the uplink multiplexed time-frequency resource at least based on the time domain position of the last symbol of the indication information may include S41, S42 and S43, which is described in detail below.

In S41, an offset is extracted from the indication information.

In some embodiments, the resource information of the time domain resource includes a start position of the time domain resource, and the indication information of the uplink multiplexed time-frequency resource further includes the offset.

In some embodiments, the offset may be an offset duration of the start position relative to a time domain position of the last symbol.

In some embodiments, extracting the offset from the indication information includes: determining a number of bits occupied by the offset; and extracting the offset from the indication information based on the number of bits occupied by the offset.

In some embodiments, the number of bits occupied by the offset is determined based on the following formula, $$J=\text{ceil}(\log(L \cdot 2^{\mu-\mu'}))$$

where J is the number of bits occupied by the offset, $\mu$ is sub-carrier spacing configuration of a serving cell where uplink time-frequency resource multiplexing occurs, $\mu'$ is sub-carrier spacing configuration of a serving cell sending the indication information of the uplink multiplexed time-frequency resource, and L is a number of time domain uplink symbols contained in a monitoring period indicated by the uplink multiplexed time-frequency resource. The sub-carrier spacing configuration of each serving cell may be fixedly configured by a protocol, for example, configured as 0 or 1.

It could be understood that when J bits are employed to indicate the offset, the preceding one or more bits may be padded with 0. For example, when 3 bits are employed to indicate an offset of 1 symbol, '001' may be employed to represent the offset.

In some embodiments, the number of bits occupied by the offset is determined by a formula, so that both the base station and the user equipment can determine through the formula instead of the base station sending the offset to the user equipment through signaling, which facilitates saving signaling resources.

In S42, a preset processing duration is added to the time domain position of the last symbol of the indication information to obtain a reference start position.

Figure 5:
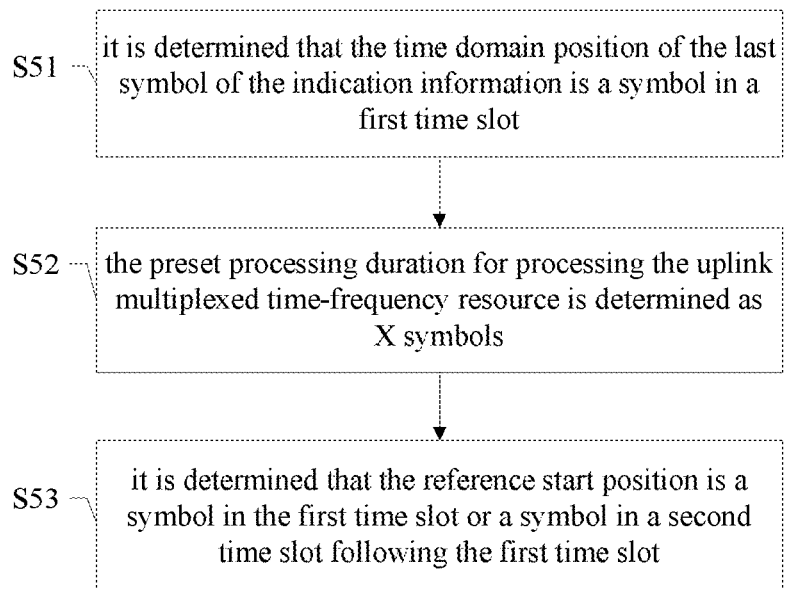
FIG. 5 is a flow chart of S42 as shown in FIG. 4 according to an embodiment.

Referring to FIG. 5, FIG. 5 is a flow chart of S42 as shown in FIG. 4 according to an embodiment. Adding the preset processing duration to the time domain position of the last symbol of the indication information to obtain the reference start position may include S51, S52 and S53, which is described in detail below.

In S51, it is determined that the time domain position of the last symbol of the indication information is a symbol in a first time slot.

In some embodiments, the symbol is $\lfloor M \cdot 2^{\mu-\mu'} \rfloor$.

In some embodiments, the last symbol $\lfloor M \cdot 2^{\mu-\mu'} \rfloor$ of the indication information may be the last symbol of a Control Resource Set (CORESET) from which the uplink multiplexed time-frequency resource indication is transmitted.

In S52, the preset processing duration for processing the uplink multiplexed time-frequency resource is determined as X symbols.

In some embodiments, the X symbols may be a time required for the user to process the uplink multiplexed time-frequency resource indication, and X may be obtained through pre-definition.

In S53, it is determined that the reference start position is a symbol in the first time slot or a symbol in a second time slot following the first time slot.

In some embodiments, the symbol in the first time slot is $\lfloor M \cdot 2^{\mu-\mu'} \rfloor + X + 1$, and the symbol in the second time slot following the first time slot is $(\lfloor M \cdot 2^{\mu-\mu'} \rfloor + X + 1) \bmod 14$.

In some embodiments, the preset processing duration is added to the time domain position of the last symbol of the indication information to obtain the reference start position where to be the symbol $\lfloor M \cdot 2^{\mu-\mu'} \rfloor + X + 1$ in the first time slot or the symbol $(\lfloor M \cdot 2^{\mu-\mu'} \rfloor + X + 1) \bmod 14$ in the second time slot following the first time slot, where $\mu$ is sub-carrier spacing configuration of a serving cell where uplink time-frequency resource multiplexing occurs, and $\mu'$ is sub-carrier spacing configuration of a serving cell sending the indication information of the uplink multiplexed time-frequency resource.

Still referring to FIG. 4, in S43, the offset is added to the reference start position to obtain the start position of the time domain resource.

In some embodiments, the user equipment periodically monitors the uplink multiplexed time-frequency resource indication according to configuration of the base station. After the uplink multiplexed time-frequency resource indication is received and decoded successfully, according to the start position of the time domain resource and the resource information of the frequency domain resource, if the determined position of the uplink multiplexed time-frequency resource is overlapped with a position of the time-frequency resource where the user is performing uplink transmission, the user cancels the on-going uplink transmission according to the time-frequency domain range determined by the uplink multiplexed time-frequency resource indication.

In the embodiments of the present disclosure, the offset is indicated through the indication information of the uplink multiplexed time-frequency resource, and the start position of the time domain resource is determined based on the offset, which facilitates obtaining more accurate start position of the time domain resource, so that the user equipment starts cancelling uplink transmission at the time domain position which is determined to be multiplexed, to avoid too early or too late stop.

Still referring to FIG. 1, in S13, the resource information of the time domain resource further includes an end position of the time domain resource.

In some embodiments, the end position of the time domain resource may be determined based on a lasting duration of the time domain resource which is determined based on a reference range of the time domain resource. The reference range of the time domain resource may be pre-defined, for example, determined by a protocol, or may be pre-informed to the user equipment by the base station.

In some embodiments, in S13, determining the resource information of the time domain resource in the uplink multiplexed time-frequency resource at least based on the time domain position of the last symbol of the indication information further includes: determining a lasting duration of the time domain resource; and determining the end position of the time domain resource based on the start position and the lasting duration of the time domain resource.

In some embodiments, the end position of the time domain resource may be determined based on an end position of a time slot where the time domain resource is located.

In some embodiments, in S13, determining the resource information of the time domain resource in the uplink multiplexed time-frequency resource at least based on the time domain position of the last symbol of the indication information further includes: determining a third time slot where the start position of the time domain resource is located, and taking an end position of the third time slot as the end position of the time domain resource.

In some embodiments, the indication information of the uplink multiplexed time-frequency resource is set to be sent in each time slot, to make the user equipment determine whether a time-frequency resource is multiplexed in each time slot, so that uplink transmission is cancelled between the start position of the time-frequency resource and the end position of the time slot.

In some embodiments, the indication information of the uplink multiplexed time-frequency resource may be sent at a start time of each time slot.

In some embodiments, the user equipment may determine only the start position of the time domain resource, and cancel the uplink transmission from the start position.

Figure 6:
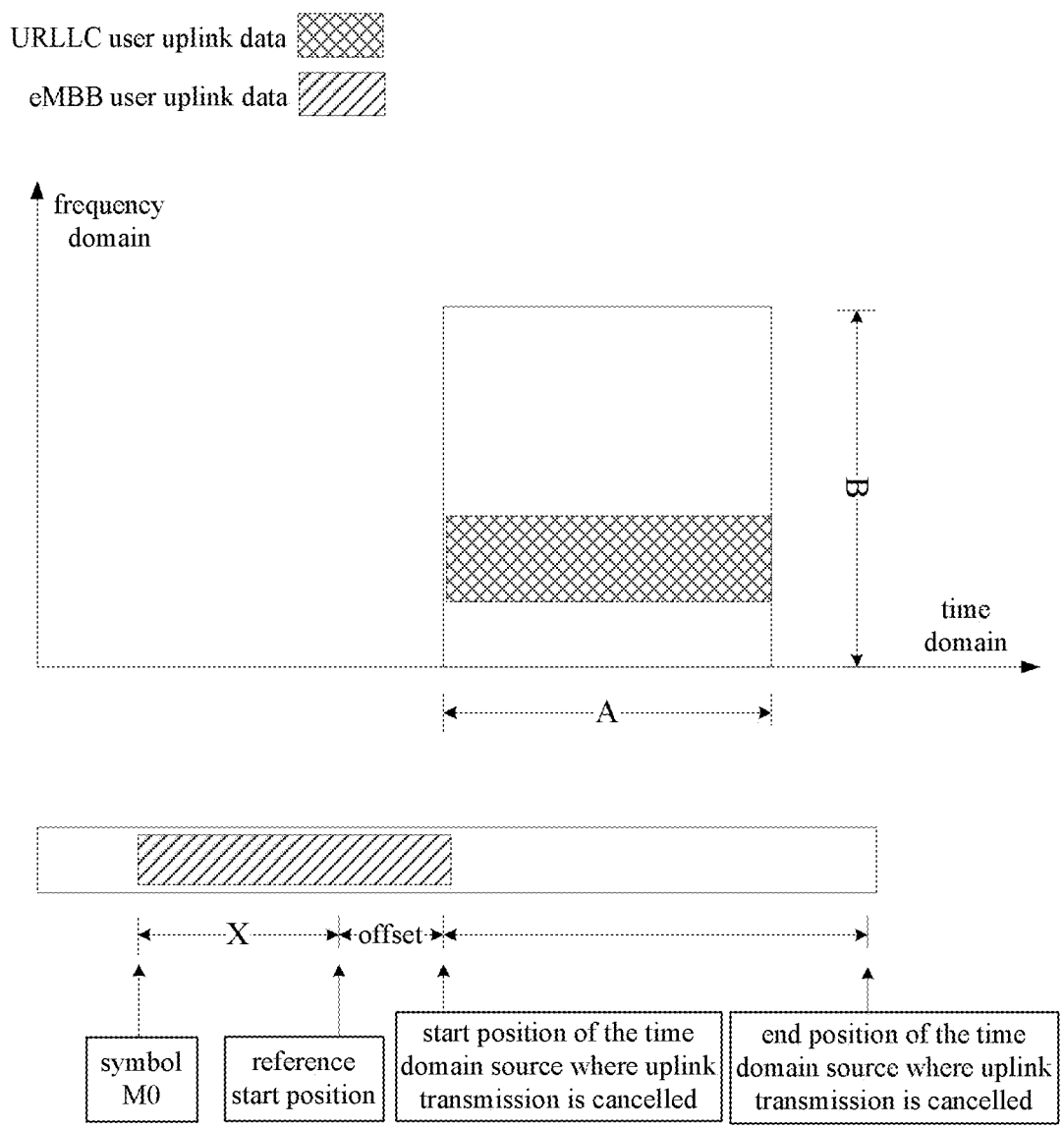
FIG. 6 is a first application scenario diagram of a method for determining an uplink multiplexed time-frequency resource according to an embodiment.

Referring to FIG. 6, FIG. 6 is a first application scenario diagram of a method for determining an uplink multiplexed time-frequency resource according to an embodiment.

In the embodiment, an URLLC user and an eMBB user are taken as an example. The two users perform uplink transmission based on scheduling. The URLLC user is allowed to schedule and multiplex uplink transmission resources of the eMBB user, multiplexing the time domain resource A and the frequency domain resource B. The base station notifies the eMBB user to cancel eMBB transmission on the time-frequency transmission resource on which the URLLC user will perform uplink transmission by sending to the eMBB user indication information of the uplink multiplexed time-frequency resource.

In some embodiments, the time domain position of the last symbol of the indication information is a symbol M0 in a time slot, where M0 indicates the symbol $\lfloor M \cdot 2^{\mu-\mu'} \rfloor$, i.e., the last symbol of the CORESET from which the uplink multiplexed time-frequency resource indication is transmitted. The reference start position is located at X symbols following the symbol M0, and further the offset is added to the reference start position to obtain the start position of the time domain resource.

Further, the eMBB user cancels the eMBB transmission from the start position of the time domain resource, and the end position of the time slot where the start position is located is taken as the end position of the time domain resource, that is, uplink transmission is cancelled within the remaining time from the start position in the time slot.

Figure 7:
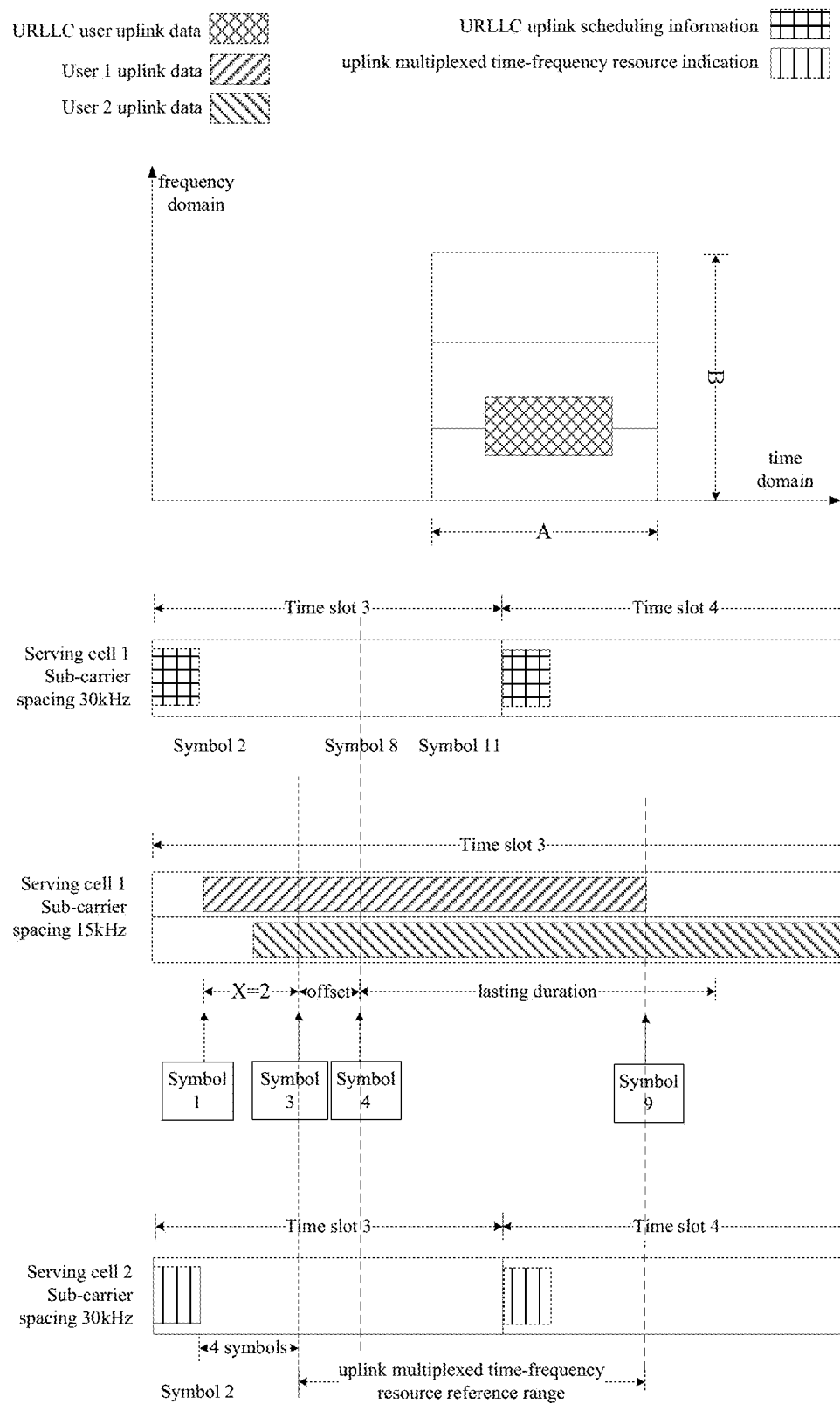
FIG. 7 is a second application scenario diagram of a method for determining an uplink multiplexed time-frequency resource according to an embodiment.

Referring to FIG. 7, FIG. 7 is a second application scenario diagram of a method for determining an uplink multiplexed time-frequency resource according to an embodiment.

In the embodiment, three users perform uplink transmission based on scheduling, including an URLLC user and two eMBB users of eMBB users 1 and 2. The URLLC user is allowed to schedule and multiplex uplink transmission resources of the eMBB users 1 and 2. The base station notifies the eMBB users to cancel eMBB transmission on the time-frequency transmission resource on which the URLLC user will perform uplink transmission by sending to the eMBB users 1 and 2 indication information of the uplink multiplexed time-frequency resource.

Specifically, the base station sends the uplink multiplexed time-frequency resource indication for the eMBB users 1 and 2 through a group common control channel. DCI includes two uplink multiplexed time-frequency resource indication fields. Taking each indication field including 6 bits as an example, the first indication field corresponds to a serving cell 1 of the eMBB users 1 and 2, and the second indication field corresponds to a serving cell 2 of the eMBB users 1 and 2.

As shown in FIG. 7, the serving cell 1 has two eMBB users, the user 1 and the user 2. The user 1 receives uplink scheduling information in a time slot before a time point t, and is scheduled to start transmitting uplink data from a symbol 1 in a time slot 3 beginning at the time point t to a symbol 9, and a transmission resource frequency domain range is CRB61-CRB110 under a sub-carrier spacing of 15 kHz. The user 2 receives uplink scheduling information in a time slot before the time point t, and is scheduled to start transmitting uplink data from a symbol 2 in the time slot 3 beginning at the time point t to the end of the current time slot, and a transmission resource frequency domain range is CRB121-CRB170 with a sub-carrier spacing of 15 kHz.

The base station receives an uplink transmission request of the URLLC user before the time point t, sends uplink scheduling information to the URLLC user in symbols 0-1 in the time slot 3 starting at the time point t, and schedules the URLLC user to transmit uplink data in symbols 8-11 in the time slot 3, and the transmission resource frequency domain range is CRB37-CRB51 under a sub-carrier spacing of 30 kHz. Therefore, considering that the URLLC user of the serving cell 1 will multiplex an uplink transmission resource of the eMBB user, the base station sends uplink multiplexed time-frequency resource indication to the eMBB user. A time domain range of the multiplexing includes symbols 8-11 in the time slot 3 under a sub-carrier spacing of 30 kHz which correspond to symbols 4-5 in the time slot 3 under a sub-carrier spacing of 15 kHz, and a frequency domain range of the multiplexing includes CRB40-CRB54 under a sub-carrier spacing of 30 kHz which corresponds to CRB76-CRB105 under a sub-carrier spacing of 15 kHz.

The base station sends the uplink multiplexed time-frequency resource indication by adopting the group common control channel on the serving cell 2 and scrambling with UL-MI-RNTI. A corresponding sub-carrier spacing is 30 kHz, and a monitoring period is 0.5 ms, i.e., 14 symbols under 30 kHz, L is equal to 14, and a monitoring symbol position in a period is first two symbols of a time slot. An uplink multiplexed time-frequency resource indication field correspondingly indicates uplink multiplexing of the eMBB users 1 and 2 on the serving cell 1. Therefore, in some embodiments, the previous j=ceil(log (L·$2^{\mu-\mu'}$))=3 bits in (K=6) bits of the first indication field of the uplink multiplexed time-frequency resource are used for indicating the start position of the uplink multiplexed time-domain resource, where $\mu$=0, $\mu'$=1.

In some embodiments, a processing time for a user to process the uplink multiplexed time-frequency resource indication is predefined as two-symbol length under a sub-carrier spacing of 15 kHz, i.e., X=2, and the last symbol of CORESET from which the uplink multiplexed time-frequency resource indication is transmitted is symbol 1 in a next time slot of 30 kHz. Therefore, as $\lfloor M \cdot 2^{\mu-\mu'} \rfloor$=0, $\lfloor M \cdot 2^{\mu-\mu'} \rfloor$+X+1=3, and the start position of the reference range is symbol 3. Considering that the start position of the actually multiplexed uplink time domain resource is symbol 4, which shifts one symbol J=3 relative to the start position of the reference range, with a bit representation as '001', the remaining (K−J=3) bits are used for indicating the multiplexed frequency domain resource.

In some embodiments, the base station pre-configures a reference range of the frequency domain resource of the serving cell 1 as CRB25-CRB200 under a sub-carrier spacing of 15 kHz. Therefore, 176 RBs are divided into (K−J=3) groups, a group 1 with a frequency domain range of CRB25-CRB83, a group 2 with a frequency domain range of CRB84-CRB142, and a group 3 with a frequency domain range of CRB143-CRB200. As the actually multiplexed uplink frequency domain resource range is CRB76-CRB105, the three bits are determined to be '110'.

By the combination of the time domain indication and the frequency domain indication, 6 bits in the first indication field is '001110'.

Besides, at the serving cell 2, an uplink scheduling request is not received from the URLLC user before the time point t. Therefore, uplink resource multiplexing does not occur in a time slot starting from the time point t in the serving cell 2, and 6 bits of the second indication field of the uplink multiplexed time-frequency resource is "000000".

The eMBB users 1 and 2 monitor the UL-MI-RNTI scrambled group common control channel at the symbols 0 and 1 of the time slot 3 starting from the time point t on the serving cell 2, and obtain information bits of 001110000000 after successful decoding.

Based on a corresponding relation between indication fields and serving cells, it is determined that uplink time-frequency resource multiplexing will occur in the serving cell 1 and will not occur in the serving cell 2. Specifically, according to J=ceil(log(L·$2^{\mu-\mu'}$))=3, it is determined that the first three bits '001' of the first indication field are used for indicating the offset of the start symbol of the uplink multiplexed time domain resource relative to the reference range as one symbol. According to $\lfloor M \cdot 2^{\mu-\mu'} \rfloor$+X+1=3, the start position of the reference range is symbol 3, and then is added with an offset of one symbol to obtain the start position of the actually multiplexed uplink time domain resource as symbol 4. Further, the last three bits 010 of the first indication field are determined to indicate the uplink multiplexed frequency domain resource. According to the reference range of the frequency domain resource being CRB25-CRB200 under the sub-carrier spacing of 15 kHz, 176 RBs are divided into (K−J=3) groups, the frequency domain range of the first group is CRB25-CRB83, the frequency domain range of the second group is CRB84-CRB142, and the frequency domain range of the third group is CRB143-CRB200. Therefore, the multiplexed frequency domain range is determined to be group 1 and group 2 of CRB25-CRB142 according to '110'.

The eMBB user 1 determines that the time-frequency domain is overlapped with the resource range indicated by the uplink multiplexed time-frequency resource according to a time-frequency domain range of uplink transmission of the eMBB user 1, so that the whole uplink transmission is cancelled from the start symbol 4 of the time slot 3 to the end of the time slot 3 or the end of the duration.

The eMBB user 2 determines that the time-frequency domain is overlapped with the resource range indicated by the uplink multiplexed time-frequency resource according to a time-frequency domain range of uplink transmission of the eMBB user 1, so that the whole uplink transmission is cancelled from the start symbol 4 of the time slot 3 to the end of the time slot 3 or the end of the duration.

In the embodiments, the offset is indicated through the indication information of the uplink multiplexed time-frequency resource, and the start position of the time domain resource is determined further based on the offset, so that more accurate start position of the time domain resource can be obtained, and the user equipment starts cancelling uplink transmission at a time domain position which is determined to be multiplexed.

Still referring to FIG. 1, in S13, determining the resource information of the time domain resource in the uplink multiplexed time-frequency resource at least based on the time domain position of the last symbol of the indication information includes: adding a preset processing duration to a time domain position of the last symbol of the indication information to obtain the start position of the time domain resource.

In some embodiments, adding the preset processing duration to the time domain position of the last symbol of the indication information to obtain the start position of the time domain resource includes: determining that the time domain position of the last symbol of the indication information is a symbol $\lfloor M \cdot 2^{\mu-\mu'} \rfloor$ in a first time slot; determining the preset processing duration for processing the uplink multiplexed time-frequency resource as X symbols; and determining that the start position is a symbol $\lfloor M \cdot 2^{\mu-\mu'} \rfloor$+X+1 in the first time slot or a symbol ($\lfloor M \cdot 2^{\mu-\mu'} \rfloor$+X+1)mod 14 in a second time slot following the first time slot, where $\mu$ is sub-carrier spacing configuration of a serving cell where uplink time-frequency resource multiplexing occurs, and $\mu'$ is sub-carrier spacing configuration of a serving cell sending the indication information of the uplink multiplexed time-frequency resource.

In some embodiments, the resource information of the time domain resource further includes an end position of the time domain resource, and S13, i.e., determining the resource information of the time domain resource in the uplink multiplexed time-frequency resource at least based on the time domain position of the last symbol of the indication information, further includes: determining a duration of the time domain resource, and determining the end position of the time domain resource based on the start position and the duration of the time domain resource.

In some embodiments, the resource information of the time domain resource further includes an end position of the time domain resource, and S13, i.e., determining the resource information of the time domain resource in the uplink multiplexed time-frequency resource at least based on the time domain position of the last symbol of the indication information, further includes: determining a third time slot where the start position of the time domain resource is located, and taking an end position of the third time slot as the end position of the time domain resource.

In some embodiments, the indication information of the uplink multiplexed time-frequency resource does not include an offset, so that more bits can be adopted to indicate the resource information of the frequency domain resource, which facilitates obtaining more accurate frequency domain resource and avoiding a waste of transmission resources caused by cancelling uplink transmission on a large number of unmultiplexed frequency domain resources.

Figure 8:
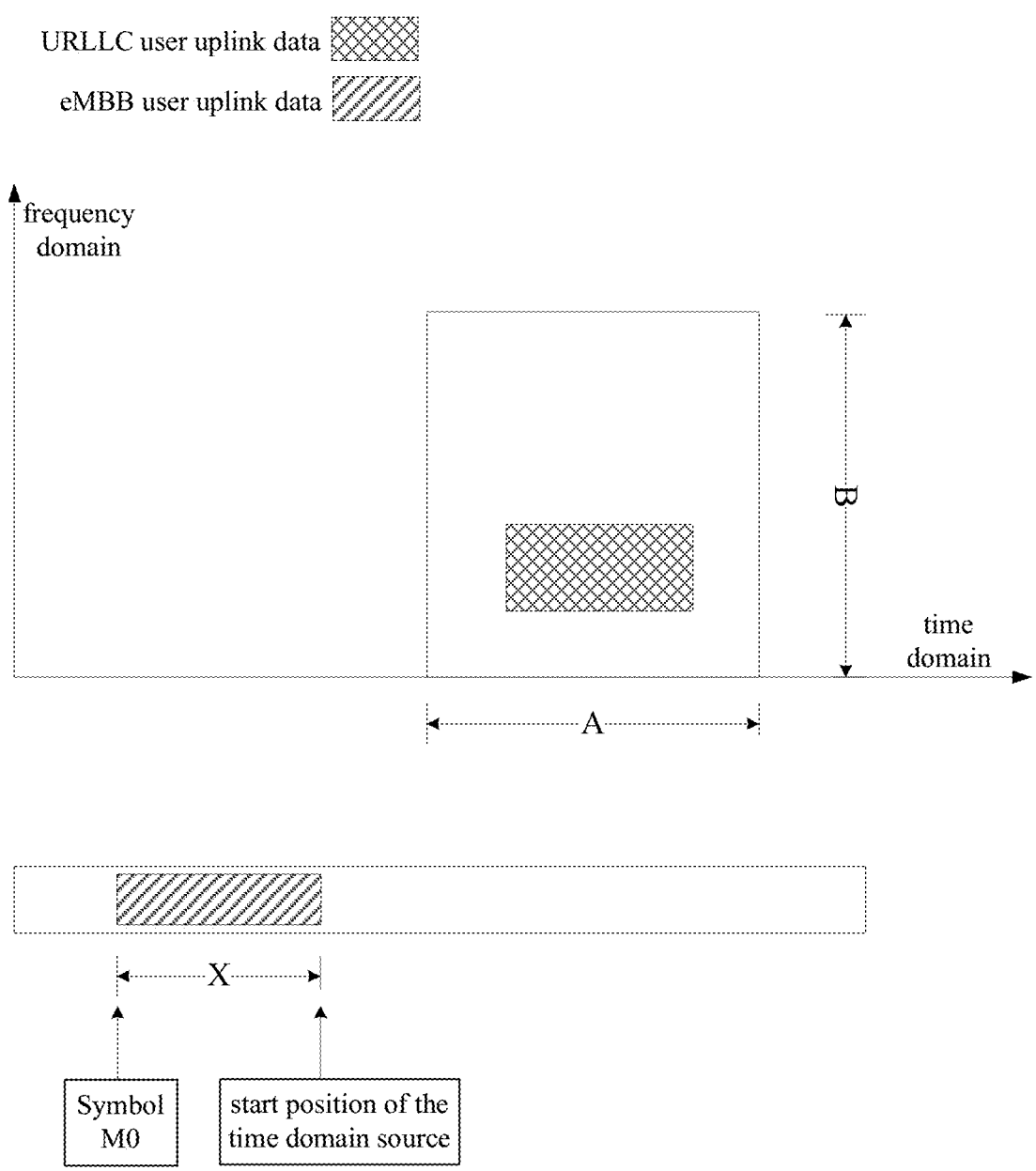
FIG. 8 is a third application scenario diagram of a method for determining an uplink multiplexed time-frequency resource according to an embodiment.

Referring to FIG. 8, FIG. 8 is a third application scenario diagram of a method for determining an uplink multiplexed time-frequency resource according to an embodiment.

In the embodiment, an URLLC user and an eMBB user are taken as an example. The two users perform uplink transmission based on scheduling. The URLLC user is allowed to schedule and multiplex uplink transmission resources of the eMBB user, multiplexing the time domain resource A and the frequency domain resource B. The base station notifies the eMBB user to cancel eMBB transmission on the time-frequency transmission resource on which the URLLC user will perform uplink transmission by sending to the eMBB user indication information of the uplink multiplexed time-frequency resource.

In some embodiments, the time domain position of the last symbol of the indication information is a symbol M0 in a time slot, where M0 indicates the symbol $\lfloor M \cdot 2^{\mu-\mu'} \rfloor$, i.e., the last symbol of the CORESET from which the uplink multiplexed time-frequency resource indication is transmitted. The start position of the time domain resource is located at X symbols following the symbol M0.

Further, the eMBB user cancels the eMBB transmission from the start position of the time domain resource, and the end position of the time slot where the start position is located is taken as the end position of the time domain resource, that is, uplink transmission is cancelled within the remaining time from the start position in the time slot.

It should be noted that, compared with the method for determining the uplink multiplexed time-frequency resource as shown in FIG. 6, in the method as shown in FIG. 8, as no offset is included, a position where the eMBB user cancels the uplink transmission is advanced.

Figure 9:
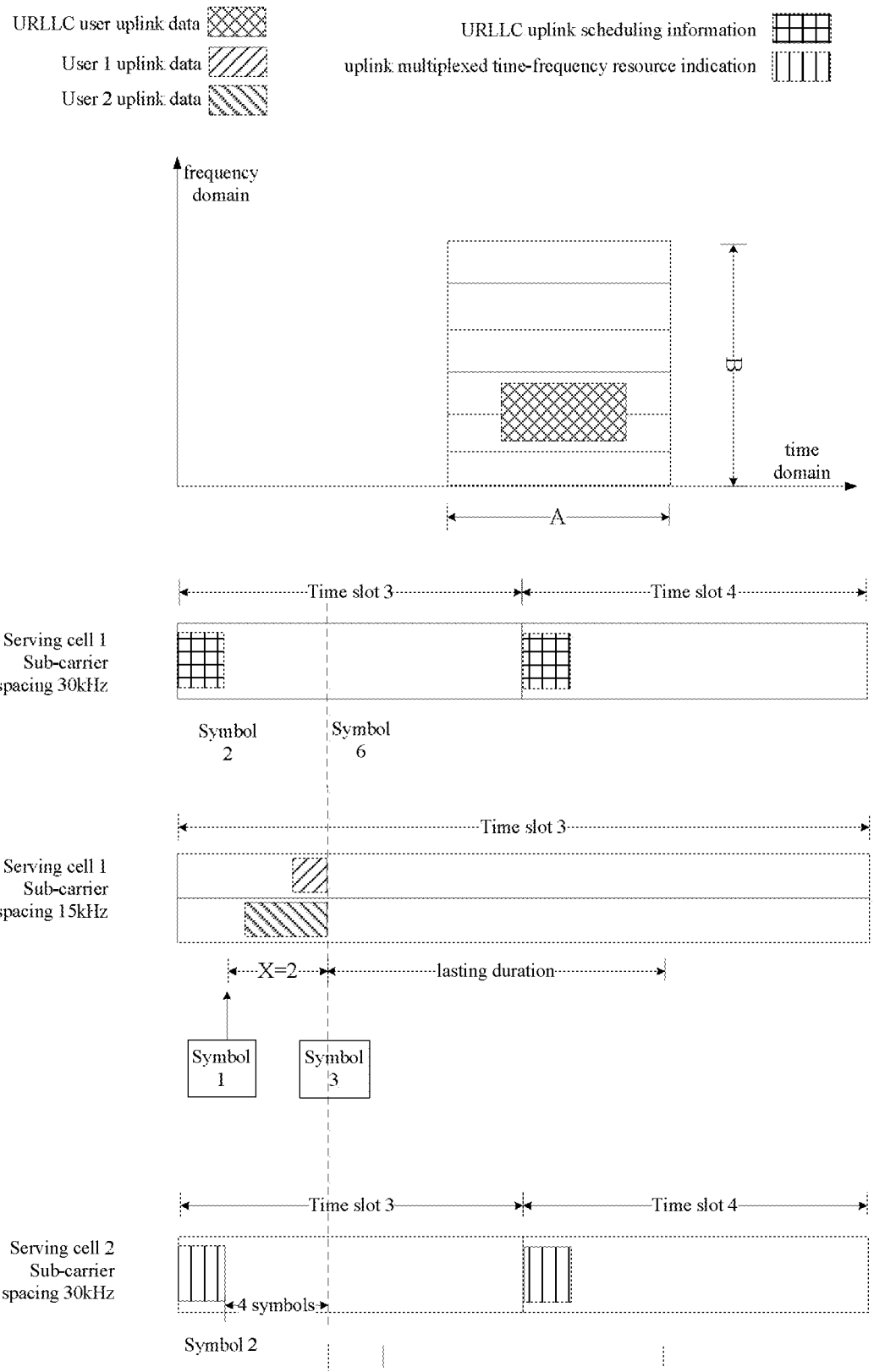
FIG. 9 is a fourth application scenario diagram of a method for determining an uplink multiplexed time-frequency resource according to an embodiment.

Referring to FIG. 9, FIG. 9 is a fourth application scenario diagram of a method for determining an uplink multiplexed time-frequency resource according to an embodiment.

In the embodiment, three users perform uplink transmission based on scheduling, including an URLLC user and two eMBB users of eMBB users 1 and 2. The URLLC user is allowed to schedule and multiplex uplink transmission resources of the eMBB users 1 and 2. The base station notifies the eMBB users to cancel eMBB transmission on the time-frequency transmission resource on which the URLLC user will perform uplink transmission by sending to the eMBB users 1 and 2 indication information of the uplink multiplexed time-frequency resource.

Specifically, the base station sends the uplink multiplexed time-frequency resource indication for the eMBB users 1 and 2 through a group common control channel. DCI includes two uplink multiplexed time-frequency resource indication fields. Taking each indication field including 6 bits as an example, the first indication field corresponds to a serving cell 1 of the eMBB users 1 and 2, and the second indication field corresponds to a serving cell 2 of the eMBB users 1 and 2.

As shown in FIG. 9, the base station sends the uplink multiplexed time-frequency resource indication by adopting the group common control channel on the serving cell 2 and scrambling with UL-MI-RNTI. A corresponding sub-carrier spacing is 30 kHz, and a monitoring period is 0.5 ms, i.e., 14 symbols under 30 kHz, L is equal to 14, and a monitoring symbol position in a period is first two symbols of a time slot.

As (K=6) bits are all used for indicating the multiplexed frequency domain resource, in some embodiments, the base station pre-configures a reference range of the frequency domain resource in the serving cell 1 as CRB25-CRB200 under a sub-carrier spacing of 15 kHz. Therefore, 176 RBs are divided into (K=6) groups, the frequency domain range of group 1 is CRB25-CRB54, the frequency domain range of group 2 is CRB55-CRB84, the frequency domain range of group 3 is CRB85-CRB113, the frequency domain range of group 4 is CRB114-CRB142, the frequency domain range of group 5 is CRB143-CR14RB171, and the frequency domain range of group 6 is CRB172-CRB200. As the actually multiplexed uplink frequency domain resource range is CRB76-CRB105, it can be determined that the six bits is '011000'.

Besides, at the serving cell 2, an uplink scheduling request is not received from the URLLC user before the time point t. Therefore, uplink resource multiplexing does not occur in a time slot starting from the time point tin the serving cell 2, and 6 bits of the second indication field of the uplink multiplexed time-frequency resource is '000000'.

The eMBB users 1 and 2 monitor the UL-MI-RNTI scrambled group common control channel at the symbols 0 and 1 of the time slot 3 starting from the time point t on the serving cell 2, and obtain information bits of 011000000000 after successful decoding.

Based on a corresponding relation between indication fields and serving cells, it is determined that uplink time-frequency resource multiplexing will occur in the serving cell 1 and will not occur in the serving cell 2.

Specifically, the user implicitly determines a start symbol index of the uplink multiplexed time domain resource, which is described as follows. According to X=2, the last symbol of the CORESET from which the uplink multiplexed time-frequency resource indication is transmitted is symbol 1 in the next time slot of 30 kHz. Therefore, according to $\lfloor M \cdot 2^{\mu-\mu'} \rfloor = 0$, $\lfloor M \cdot 2^{\mu-\mu'} \rfloor + X + 1 = 3$, and thus the start symbol index of the uplink multiplexed time domain resource is symbol 3.

The user determines an uplink multiplexed frequency domain resource range according to six bits 011000 of an indication field 1. Based on a reference range of the frequency domain resource being CRB25-CRB200 under a sub-carrier spacing of 15 kHZ, 176 RBs are divided into (K=6) groups, a frequency domain range of group 1 is CRB25-CRB54, a frequency domain range of group 2 is CRB55-CRB84, a frequency domain range of group 3 is CRB85-CRB113, a frequency domain range of group 4 is CRB114-CRB142, a frequency domain range of group 5 is CRB143-CRB171, and a frequency domain range of group 6 is CRB172-CRB200. As the actually multiplexed uplink frequency domain resource range is CRB76-CRB105, the multiplexed frequency domain range is determined to be groups 2 and 3 of CRB55-CRB113 according to '011000'.

The eMBB user 1 determines that the time-frequency domain is overlapped with the resource range indicated by the uplink multiplexed time-frequency resource according to a time-frequency domain range of uplink transmission of the eMBB user 1, so that the whole uplink transmission is cancelled from the start symbol 3 of the time slot 3 to the end of the time slot 3.

The eMBB user 2 determines that the frequency domain is not overlapped with the resource range indicated by the uplink multiplexed time-frequency resource according to a frequency domain range of uplink transmission of the eMBB user 2, and uplink transmission does not need to be cancelled.

In some embodiments, the indication information of the uplink multiplexed time-frequency resource does not include an offset, so that more bits can be adopted to indicate the resource information of the frequency domain resource, which facilitates obtaining more accurate frequency domain resource and avoiding a waste of transmission resources caused by cancelling uplink transmission on a large number of unmultiplexed frequency domain resources.

In some embodiments, a time-frequency domain range of the uplink multiplexed time-frequency resource may be determined in a variety of ways, which is helpful for users to select according to specific needs and improves convenience.

In some embodiments, the indication information of the uplink multiplexed time-frequency resource further includes an identifier for indicating whether the indication information includes the offset.

In some embodiments, the base station sends uplink multiplexed time-frequency resource indication for the eMBB users 1 and 2 through the group common control channel. DCI includes two uplink multiplexed time-frequency resource indication fields. One or more bits can be indicated in advance in a first indication field or a second indication field to serve as the identifier for indicating whether the indication information of the uplink multiplexed time-frequency resource includes the offset.

In some embodiments, the first bit of the first indication field may serve as the identifier, for example, '1' is adopted to indicate that the indication information includes an offset, and '0' is adopted to indicate that the indication information does not include an offset.

By setting the identifier, the user equipment can more clearly determine whether an offset is included. If an offset is included, the offset and the resource information of the frequency domain resource are determined by using the above method, and further the resource information of the time domain resource is determined according to the offset. If an offset is not included, the resource information of the frequency domain resource is determined by the above method. Afterward, the user may determine whether to cancel the uplink transmission according to an overlapping condition with a time-frequency resource range of its own uplink transmission.

In some embodiments, identifier is set for indicating whether the indication information of the uplink multiplexed time-frequency resource includes the offset. The base station may select to configure only one type of indication information or two types of indication information for the users, and the base station may be indicated to confirm when the indication information is sent each time, so that flexibility is improved.

Figure 10:
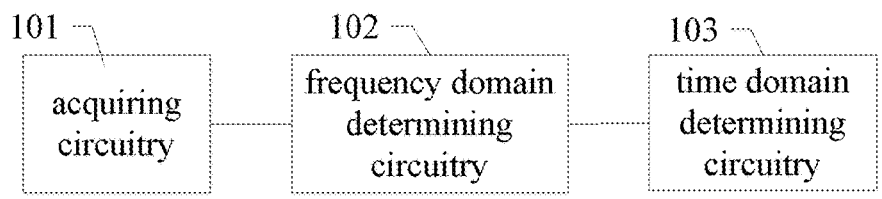
FIG. 10 is a structural diagram of a device for determining an uplink multiplexed time-frequency resource according to an embodiment.

Referring to FIG. 10, FIG. 10 is a structural diagram of a device for determining an uplink multiplexed time-frequency resource according to an embodiment.

The device for determining the uplink multiplexed time-frequency resource includes: an acquiring circuitry 101 configured to acquire indication information of the uplink multiplexed time-frequency resource from a base station, wherein the indication information includes resource indication information of a frequency domain resource in the uplink multiplexed time-frequency resource; a frequency domain determining circuitry 102 configured to determine resource information of the frequency domain resource based on the resource indication information; and a time domain determining circuitry 103 configured to determine resource information of a time domain resource in the uplink multiplexed time-frequency resource at least based on a time domain position of the last symbol of the indication information.

Figure 11:
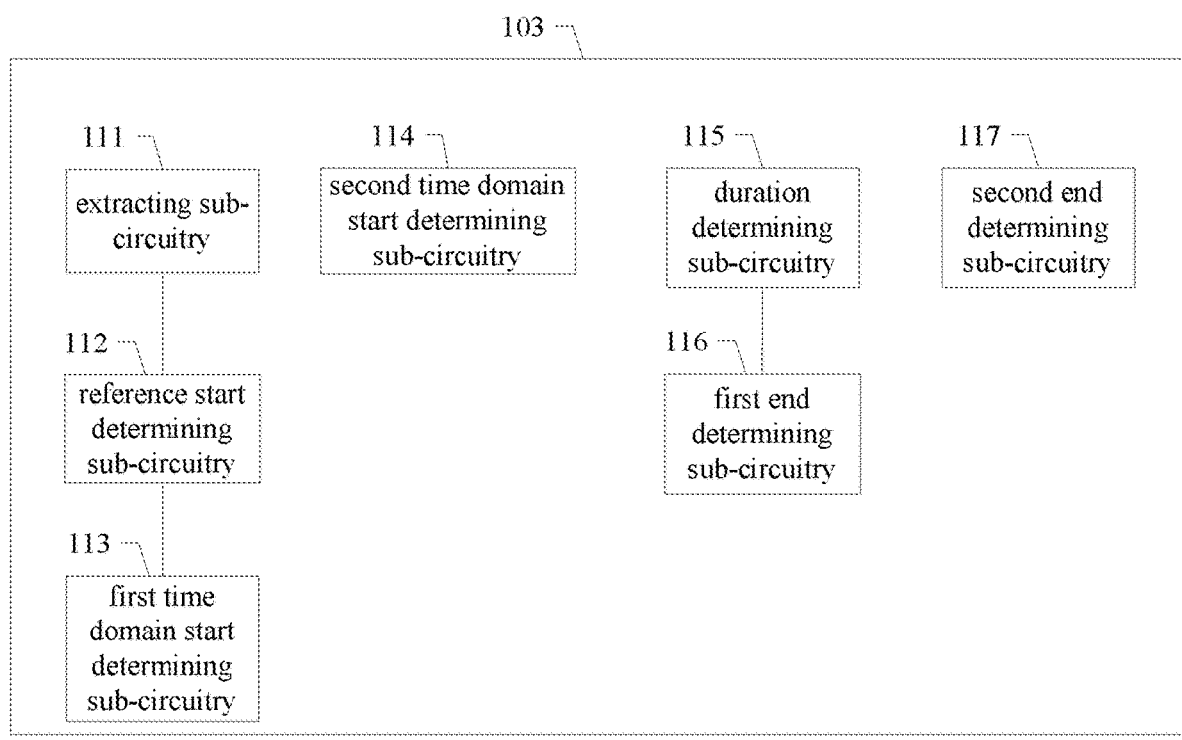
FIG. 11 is a structural diagram of a time domain determining circuitry 103 as shown in FIG. 10 according to an embodiment.

Referring to FIG. 11, FIG. 11 is a structural diagram of the time domain determining circuitry 103 as shown in FIG. 10 according to an embodiment.

The resource information of the time domain resource includes a start position of the time domain resource, and the indication information of the uplink multiplexed time-frequency resource further includes an offset. The time domain determining circuitry 103 includes: an extracting sub-circuitry 111 configured to extract the offset from the indication information; a reference start determining sub-circuitry 112 configured to add a preset processing duration to the time domain position of the last symbol of the indication information to obtain a reference start position; and a first time domain start determining sub-circuitry 113 configured to add the offset to the reference start position to obtain the start position of the time domain resource.

In some embodiments, the extracting sub-circuitry 111 includes: a bit number determining unit (not shown) configured to determine a number of bits occupied by the offset; and an extracting unit (not shown) configured to extract the offset from the indication information based on the number of bits occupied by the offset.

In some embodiments, the number of bits occupied by the offset is determined by the bit number determining unit based on the following formula, $$J=\text{ceil}(\log(L \cdot 2^{\mu-\mu'})),$$

where J is the number of bits occupied by the offset, $\mu$ is sub-carrier spacing configuration of a serving cell where uplink time-frequency resource multiplexing occurs, $\mu'$ is sub-carrier spacing configuration of a serving cell sending the indication information of the uplink multiplexed time-frequency resource, and L is a number of time domain uplink symbols contained in a monitoring period indicated by the uplink multiplexed time-frequency resource.

In some embodiments, the reference start determining sub-circuitry 112 includes: a first symbol M determining unit (not shown) configured to determine that the time domain position of the last symbol of the indication information is a symbol $\lfloor M \cdot 2^{\mu-\mu'} \rfloor$ in a first time slot; a first X symbol determining unit (not shown) configured to determine the preset processing duration for processing the uplink multiplexed time-frequency resource as X symbols; and a reference start determining unit (not shown) configured to determine that the reference start position is a symbol $\lfloor M \cdot 2^{\mu-\mu'} \rfloor + X+1$ ($\lfloor M \cdot 2^{\mu-\mu'} \rfloor + X+1$)mod 14 in the first time slot or a symbol in a second time slot following the first time slot, where µ is sub-carrier spacing configuration of a serving cell where uplink time-frequency resource multiplexing occurs, and µ' is sub-carrier spacing configuration of a serving cell sending the indication information of the uplink multiplexed time-frequency resource.

In some embodiments, the resource information of the time domain resource includes a start position of the time domain resource, and the time domain determining circuitry 103 includes: a second time domain start determining sub-circuitry 114 configured to add a preset processing duration to a time domain position of the last symbol of the indication information to obtain the start position of the time domain resource.

In some embodiments, the second time domain start determining sub-circuitry 114 includes: a second symbol M determining unit (not shown) configured to determine that the time domain position of the last symbol of the indication information is a symbol $\lfloor M \cdot 2^{\mu-\mu'} \rfloor$ in a first time slot; a second X symbol determining unit (not shown) configured to determine the preset processing duration for processing the uplink multiplexed time-frequency resource as X symbols; and a time domain start determining unit (not shown) configured to determine that the start position is a symbol $\lfloor M \cdot 2^{\mu-\mu'} \rfloor + X + 1$ in the first time slot or a symbol $(\lfloor M \cdot 2^{\mu-\mu'} \rfloor + X + 1) \bmod 14$ in a second time slot following the first time slot, where µ is sub-carrier spacing configuration of a serving cell where uplink time-frequency resource multiplexing occurs, and µ' is sub-carrier spacing configuration of a serving cell sending the indication information of the uplink multiplexed time-frequency resource.

In some embodiments, the resource information of the time domain resource further includes an end position of the time domain resource, and the time domain determining circuitry 103 further includes: a duration determining sub-circuitry 115 configured to determine a duration of the time domain resource; and a first end determining sub-circuitry 116 configured to determine the end position of the time domain resource based on the start position and the duration of the time domain resource.

In some embodiments, the resource information of the time domain resource further includes an end position of the time domain resource, and the time domain determining circuitry 103 further includes: a second end determining sub-circuitry 117 configured to determine a third time slot where the start position of the time domain resource is located, and take an end position of the third time slot as the end position of the time domain resource.

Figure 12:
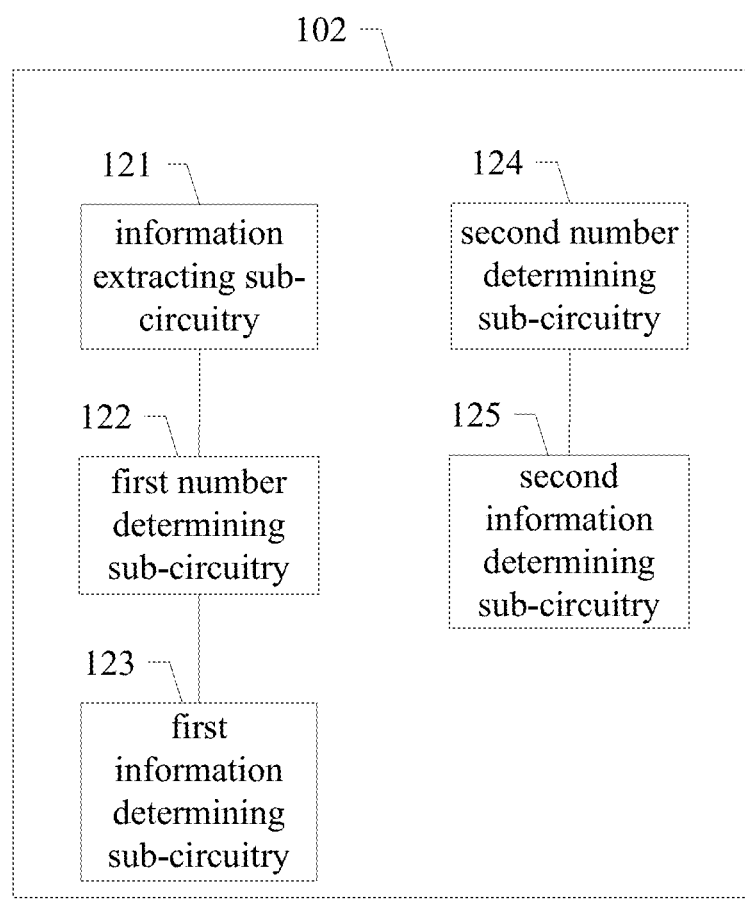
FIG. 12 is a structural diagram of a frequency domain determining circuitry 102 as shown in FIG. 10 according to an embodiment.

Referring to FIG. 12, FIG. 12 is a structural diagram of the frequency domain determining circuitry 102 as shown in FIG. 10 according to an embodiment.

In some embodiments, a reference range of the frequency domain resource is divided into a plurality of frequency domain indication units, and is pre-configured by the base station. The frequency domain determining circuitry 102 includes: an information extracting sub-circuitry 121 configured to extract the resource indication information from the indication information; a first number determining sub-circuitry 122 configured to determine a number of the plurality of frequency domain indication units and whether each of the plurality of frequency domain indication units is occupied based on the resource indication information; and a first information determining sub-circuitry 123 configured to take information of the occupied frequency domain indication units as the resource information of the frequency domain resource.

In some embodiments, the information extracting sub-circuitry 121 includes: a frequency domain bit number determining unit (not shown) configured to determine a bit number of the resource indication information to be (K−J) based on a preset bit number K of the indication information of the uplink multiplexed time-frequency resource, where J is the bit number occupied by the offset; and an information extracting unit (not shown) configured to extract the resource indication information from the indication information based on the bit number (K−J) of the resource indication information, where a number of the plurality of frequency domain indication units is (K−J).

In some embodiments, the indication information does not include an offset, a reference range of the frequency domain resource is divided into a plurality of frequency domain indication units, and the frequency domain determining circuitry 102 includes: a second number determining sub-circuitry 124 configured to determine a number of the plurality of frequency domain indication units and whether each of the plurality of frequency domain indication units is occupied based on the resource indication information; and a second information determining sub-circuitry 125 configured to take information of the occupied frequency domain indication units as the resource information of the frequency domain resource, wherein the reference range of the frequency domain resource is pre-configured by the base station.

In some embodiments, the indication information of the uplink multiplexed time-frequency resource further includes an identifier for indicating whether the indication information includes the offset.

Principles, detailed implementation and advantages of the device for determining an uplink multiplexed time-frequency resource can be found in the above descriptions of the method as shown in FIG. 1 to FIG. 9, and are not described here.

In an embodiment of the present disclosure, a storage medium having computer instructions stored therein is provided, wherein when the computer instructions are executed, the above method as shown in FIG. 1 to FIG. 5 is performed. The storage medium may be a computer readable storage medium, for example, including a non-volatile or non-transitory memory, an optical disk, a mechanical disk, a solid disk or the like.

In an embodiment of the present disclosure, a user equipment including a memory and a processor is provided, wherein the memory has computer instructions stored therein, and when the processor executes the computer instructions, the above method as shown in FIG. 1 to FIG. 5 is performed. The user equipment may include but not limited to a mobile phone, a computer or a tablet computer.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for determining an uplink multiplexed time-frequency resource, comprising:
  acquiring indication information of the uplink multiplexed time-frequency resource from a base station, wherein the indication information comprises resource indication information of a frequency domain resource in the uplink multiplexed time-frequency resource;

determining resource information of the frequency domain resource based on the resource indication information; and determining resource information of a time domain resource in the uplink multiplexed time-frequency resource at least based on a time domain position of the last symbol of the indication information, wherein the indication information of the uplink multiplexed time-frequency resource further comprises an identifier for indicating whether the indication information comprises an offset.

2. The method according to claim 1, wherein the resource information of the time domain resource comprises a start position of the time domain resource, and determining the resource information of the time domain resource in the uplink multiplexed time-frequency resource at least based on the time domain position of the last symbol of the indication information comprises:

adding a preset processing duration to a time domain position of the last symbol of the indication information to obtain the start position of the time domain resource.

3. The method according to claim 2, wherein adding the preset processing duration to the time domain position of the last symbol of the indication information to obtain the start position of the time domain resource comprises:

determining that the time domain position of the last symbol of the indication information is a symbol $\lfloor M \cdot 2^{\mu-\mu'} \rfloor$ in a first time slot;

determining the preset processing duration for processing the uplink multiplexed time-frequency resource as X symbols; and determining that the start position is a symbol $\lfloor M \cdot 2^{\mu-\mu'} \rfloor + X+1$ in the first time slot or a symbol $(\lfloor M \cdot 2^{\mu-\mu'} \rfloor + X+1)$ mod 14 in a second time slot following the first time slot, where $\mu$ is sub-carrier spacing configuration of a serving cell where uplink time-frequency resource multiplexing occurs, and $\mu'$ is sub-carrier spacing configuration of a serving cell sending the indication information of the uplink multiplexed time-frequency resource.

4. The method according to claim 2, wherein the resource information of the time domain resource further comprises an end position of the time domain resource, and determining the resource information of the time domain resource in the uplink multiplexed time-frequency resource at least based on the time domain position of the last symbol of the indication information further comprises:

determining a first time slot where the start position of the time domain resource is located, and taking an end position of the first time slot as the end position of the time domain resource.

5. The method according to claim 1, wherein determining the resource information of the time domain resource in the uplink multiplexed time-frequency resource at least based on the time domain position of the last symbol of the indication information comprises:

adding a preset processing duration to the time domain position of the last symbol of the indication information to obtain a reference start position.

6. The method according to claim 5, wherein the resource information of the time domain resource comprises a start position of the time domain resource, the indication information of the uplink multiplexed time-frequency resource further comprises the offset, and determining the resource information of the time domain resource in the uplink multiplexed time-frequency resource at least based on the time domain position of the last symbol of the indication information further comprises:

extracting the offset from the indication information; and adding the offset to the reference start position to obtain the start position of the time domain resource.

7. The method according to claim 6, wherein extracting the offset from the indication information comprises:

determining a number of bits occupied by the offset; and extracting the offset from the indication information based on the number of bits occupied by the offset.

8. The method according to claim 7, wherein the number of bits occupied by the offset is determined based on the following formula, $$J = \text{ceil}(\log(L \cdot 2^{\mu-\mu'}))$$

where J is the number of bits occupied by the offset, $\mu$ is sub-carrier spacing configuration of a serving cell where uplink time-frequency resource multiplexing occurs, $\mu'$ is sub-carrier spacing configuration of a serving cell sending the indication information of the uplink multiplexed time-frequency resource, and L is a number of time domain uplink symbols contained in a monitoring period indicated by the uplink multiplexed time-frequency resource.

9. The method according to claim 6, wherein the resource information of the time domain resource further comprises an end position of the time domain resource, and determining the resource information of the time domain resource in the uplink multiplexed time-frequency resource at least based on the time domain position of the last symbol of the indication information further comprises:

determining a first time slot where the start position of the time domain resource is located, and taking an end position of the first time slot as the end position of the time domain resource.

10. The method according to claim 5, wherein adding the preset processing duration to the time domain position of the last symbol of the indication information to obtain the reference start position comprises:

determining that the time domain position of the last symbol of the indication information is a symbol $\lfloor M \cdot 2^{\mu-\mu'} \rfloor$ in a first time slot;

determining the preset processing duration for processing the uplink multiplexed time-frequency resource as X symbols; and determining that the reference start position is a symbol $\lfloor M \cdot 2^{\mu-\mu'} \rfloor + X+1$ in the first time slot or a symbol $(\lfloor M \cdot 2^{\mu-\mu'} \rfloor + X+1)$ mod 14 in a second time slot following the first time slot, where $\mu$ is sub-carrier spacing configuration of a serving cell where uplink time-frequency resource multiplexing occurs, and $\mu'$ is sub-carrier spacing configuration of a serving cell sending the indication information of the uplink multiplexed time-frequency resource.

11. The method according to claim 1, wherein a reference range of the frequency domain resource is pre-configured by the base station.

12. The method according to claim 11, wherein the reference range of the frequency domain resource is divided into a plurality of frequency domain indication units, and determining resource information of the frequency domain resource based on the resource indication information comprises:

extracting the resource indication information from the indication information;

determining a number of the plurality of frequency domain indication units and whether each of the plurality of frequency domain indication units is occupied based on the resource indication information; and taking information of the occupied frequency domain indication units as the resource information of the frequency domain resource.

13. The method according to claim 12, wherein extracting the resource indication information from the indication information comprises:

determining a bit number of the resource indication information to be (K−J) based on a preset bit number K of the indication information of the uplink multiplexed time-frequency resource, where J is the bit number occupied by the offset; and extracting the resource indication information from the indication information based on the bit number (K−J) of the resource indication information, where a number of the plurality of frequency domain indication units is (K−J).

14. The method according to claim 11, wherein the indication information does not comprise the offset, the reference range of the frequency domain resource is divided into a plurality of frequency domain indication units, and determining resource information of the frequency domain resource based on the resource indication information comprises:

determining a number of the plurality of frequency domain indication units and whether each of the plurality of frequency domain indication units is occupied based on the resource indication information; and taking information of the occupied frequency domain indication units as the resource information of the frequency domain resource.

15. A storage medium having computer instructions stored therein, wherein when the computer instructions are executed, the method according to claim 1 is performed.

16. A user equipment comprising a memory and a processor, wherein the memory has computer instructions stored therein, and when the processor executes the computer instructions, the method according to claim 1 is performed.

* * * * *